United States Patent
D'Angelo et al.

(10) Patent No.: US 8,810,216 B2
(45) Date of Patent: Aug. 19, 2014

(54) CURRENT SINK WITH LOW SIDE VOLTAGE REGULATION

(75) Inventors: Kevin D'Angelo, Santa Clara, CA (US);
Andrew Whyte, San Carlos, CA (US);
Gustavo Mehas, Mercer Island, WA (US)

(73) Assignee: Advanced Analogic Technologies Incorporated, Santa Clara, CA (US)

( * ) Notice: Subject to any disclaimer, the term of this patent is extended or adjusted under 35 U.S.C. 154(b) by 568 days.

(21) Appl. No.: 13/174,225

(22) Filed: Jun. 30, 2011

(65) Prior Publication Data
US 2013/0002219 A1    Jan. 3, 2013

(51) Int. Cl.
*G05F 1/00*    (2006.01)
*H05B 37/02*   (2006.01)

(52) U.S. Cl.
USPC .............................. 323/271; 323/285; 315/308

(58) Field of Classification Search
CPC .............................. H05B 33/0848; G05F 1/40
USPC .......... 323/268, 271, 282, 285; 315/186, 193, 315/195, 210, 216, 294, 308, 313, 320
See application file for complete search history.

(56) References Cited

U.S. PATENT DOCUMENTS

| | | | | |
|---|---|---|---|---|
| 7,852,649 | B2* | 12/2010 | Hsiao | 363/97 |
| 8,299,724 | B2* | 10/2012 | Huynh | 315/291 |
| 2011/0227503 | A1* | 9/2011 | Yuan et al. | 315/294 |
| 2013/0162150 | A1* | 6/2013 | Masuda | 315/186 |

\* cited by examiner

*Primary Examiner* — Matthew Nguyen
(74) *Attorney, Agent, or Firm* — Lando & Anastasi, LLP

(57) ABSTRACT

An integrated circuit contains a current sink that is used to control a channel of varying forward voltage, with a goal of maintaining a minimally sufficient voltage across the current sink. A target voltage for the current sink return is determined, and a switched inductor is used to maintain said voltage. Various target determination schemes are possible, and various enhancements improve startup time, efficiency, and effectiveness.

20 Claims, 6 Drawing Sheets

CURRENT SINK WITH LOW SIDE VOLTAGE REGULATION

BACKGROUND OF THE INVENTION

Modern televisions with LED backlights have tended towards longer strings of serially connected LEDs that are controlled as one circuit. These strings, containing from 10 to 40 LEDs, can require voltages between 30 and 150 volts in order to operate effectively. In such strings, the current is regulated in order to control the color of the individual LEDs—more current tends to yield a cooler color of white, while less current tends to yield a warmer color. In order to control the color spectrum of the output, the current is held constant while the brightness is controlled using a PWM on/off mechanism—more time on yields a brighter screen.

The current through these strings is typically controlled by a current sink connected from the cathode of the LED string to ground. The current sink is cycled on and off at a given PWM duty cycle by a controller within the television, resulting in a brighter or darker screen. Such a basic circuit is shown in FIG. 1.

A problem arises because variation in the LED manufacturing process renders the forward voltage across the LEDs that compose the string to be somewhat random, and as a result, the forward voltage across "the entire string" is random as well. In the same FIG. 1, a variable forward voltage across the LEDs results in a variable voltage across the current sink—a larger string voltage results in a smaller voltage across the voltage sink, and vice versa. This occurs because in a typical application, the cathode of the current sink is at a fixed voltage, often ground. If a typical current sink requires 1.0 volts to operate, the excess voltage across the current sink, from the "floating" anode to the "fixed" cathode, can range from 1.0 volts to 5 times that or more, causing the current sink to dissipate all of the excess power. Excess power dissipation creates heat on the PCB containing the LED driver circuitry which reduces electronic component life times.

SUMMARY OF THE INVENTION

In the invention, the return voltage of the LED current sink is regulated above ground, resulting in a regulated voltage drop (and a regulated power draw) across the current sink. Without the use of the invention, the current sink's MOSFET's drain-to-source voltage would be equal to the voltage between the cathode of the LED string and ground. With the use of the invention, the source voltage of the MOSFET is instead regulated between the LED string's cathode voltage and ground.

The invention operates by using an inductor and a capacitor to regulate the voltage at the cathode of the current sink. Much as with a boost converter, the inductor is switched from a charging state to a discharging state, sending energy to the higher voltage power source as the inductor is discharging. As the inductor gains or loses energy, the voltage on the anode side of the inductor (the cathode side of the current sink) is regulated to a target voltage. This target voltage is determined through a variety of ways, and is chosen in order to set the voltage drop across the current sink to its minimal functional level, reducing power lost through heat dissipation.

DETAILED DESCRIPTION OF THE PREFERRED EMBODIMENTS

The invention maintains a minimally sufficient voltage across a current sink that drives a string of serially connected LEDs, said string having a relatively indeterminate forward voltage. It does this by primarily relying on two elements of circuitry. First, the invention calculates a target voltage Vtarget that is to be maintained at the return (lower voltage) side of the current sink. Different embodiments of the invention are engineered to calculate the target voltage using different methods, using reference points at various distinct points within the circuit to do so.

Second, the invention relies upon a capacitor and a switched inductor to maintain the target voltage. By placing the switched inductor and a capacitor in the current path below the current sink, the inductor can be alternately charged and discharged. As the actual return voltage (Vreturn) varies above and below Vtarget, the inductor is alternately charging and discharging. As is visible in FIGS. 2 and 4, as the inductor charges and therefore the voltage across the inductor decreases, Vreturn decreases as well. The reverse is also true.

Figure 1:
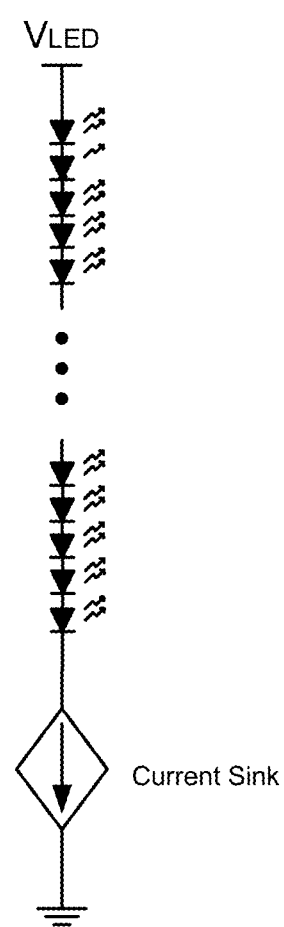
FIG. 1 shows a serially connected string of LEDs regulated with a current sink.
Figure 2:
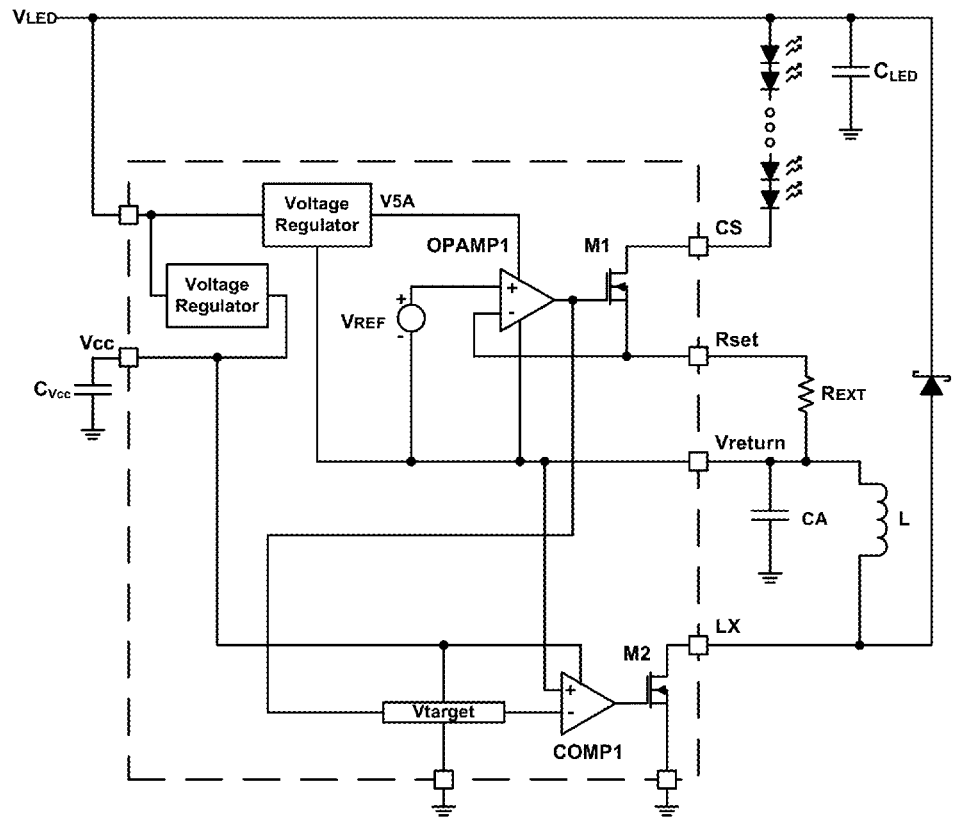
FIG. 2 shows a first embodiment of the invention controlling a string of LEDs.
Figure 3:
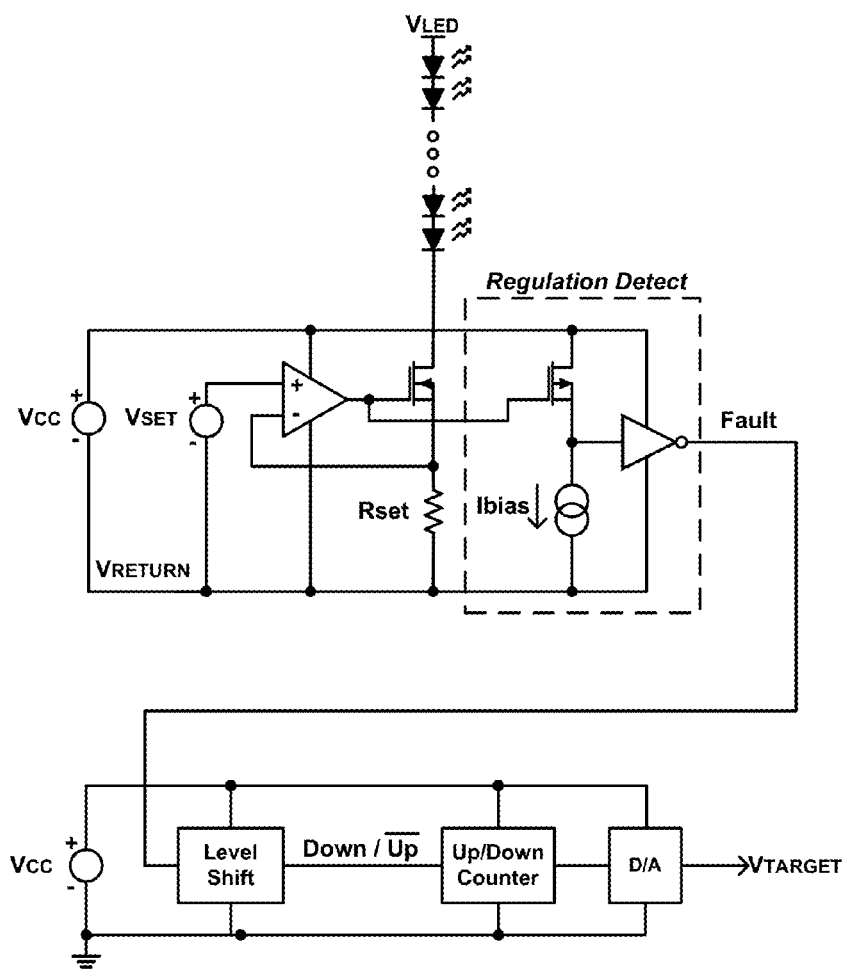
FIG. 3 shows the generation of the target voltage for the first embodiment.

FIG. 2 shows a first embodiment of the invention. In this embodiment, Vtarget is generated by increasing an initially, arbitrarily small Vtarget until the voltage across the current sink M1 decreases enough to cause it to go into dropout (the point at which the current starts to decrease from the desired setting). This method involves two main elements, a circuit to detect dropout, and a circuit to change Vtarget. Both are illustrated in FIG. 3.

The dropout detection circuit functions by monitoring the current sink amplifier output, and then detecting when the amplifier saturates. In an amplifier of sufficient gain, perhaps greater than 1,000, a small difference on the amplifier inputs (~10 mv) will cause the output of the amplifier to go to the higher or lower rail depending on the sign of the difference. When the current sink enters dropout, the negative input will fall below the positive input and the amplifier output will rise to the higher rail. To detect the dropout condition, a PMOS device is used. When the gate of the PMOS device rises to approximately one threshold voltage of the PMOS source voltage, the PMOS device will begin to turn off. Using a constant bias current conducting to ground will pull the PMOS drain node low as the PMOS turns off. An inverter adds gain to the PMOS drain node to create a digital Fault signal on the Fault line.

Other methods of detecting the fault are possible. A more precise detection method would be a comparator that compares the current sink amplifier output voltage with a fixed reference voltage. When the current sink enters dropout and the amplifier output rises above the reference voltage, the comparator signals a fault.

A counter and a D/A converter are used to generate the Vtarget voltage using the digital Fault signal from aforementioned dropout detection circuit. At startup, the counter starts at 0. A fixed frequency oscillator (approx. 20 kHz) increases the counter's count at the fixed period of the oscillator. The count is converted to an analog voltage by the D/A converter, causing the output Vtarget to rise. As a consequence of this, Vreturn rises as well, as it is regulated by the voltage control loop. As Vreturn rises as the counter's count rises, the dropout detection circuit will eventually detect that the current sink has entered dropout, and it will signal on the Fault line. When the counter sees the Fault line go high, the counter decrements the count, Vtarget falls, and as a consequence, Vreturn falls as well. Vtarget and Vreturn continue to fall in one count increments at the fixed oscillator frequency until Fault becomes low. At this point, the cycle begins again, and the count is once again repeatedly incremented until Fault becomes high. In this manner Vtarget and Vreturn will move up and down by an incremental voltage, and the current sink will operate at a voltage on average just at dropout, minimizing power dissipation across the current sink.

The incremental voltage of Vtarget is set by the number of bits in the counter and by the range of the D/A. These two values can be optimized for a given combination of VLED input voltage, LED string characteristics, and current sink requirements. A typical value would be an 8-bit counter and a 30V D/A range for an incremental voltage of 117 mV (30V/256). Also, a level shift is typically required since the dropout detect is referenced to Vreturn, and the voltage loop is referenced to GND. This is a common circuit technique.

One simple alteration can be made to the embodiment in order to reduce the startup time in acquiring "correct" Vtarget and Vreturn voltages: as the counter ramps up from the initial "0" state, the counter can be set to increment more than once per clock cycle until the first fault is detected. The speed up allows the power dissipation to be minimized more quickly at startup.

Another simple alteration would minimize the time the current sink is in dropout. In a basic embodiment, the decrement of the counter would be synchronous with the fixed clock cycle. In other words, at every rising edge of the clock, the counter either increases or decreases. The alteration would allow the decrement of the counter to be asynchronous with the fixed clock cycle, so that upon the detection of the asserted fault, Vtarget—and Vreturn—are immediately decremented.

Figure 4:
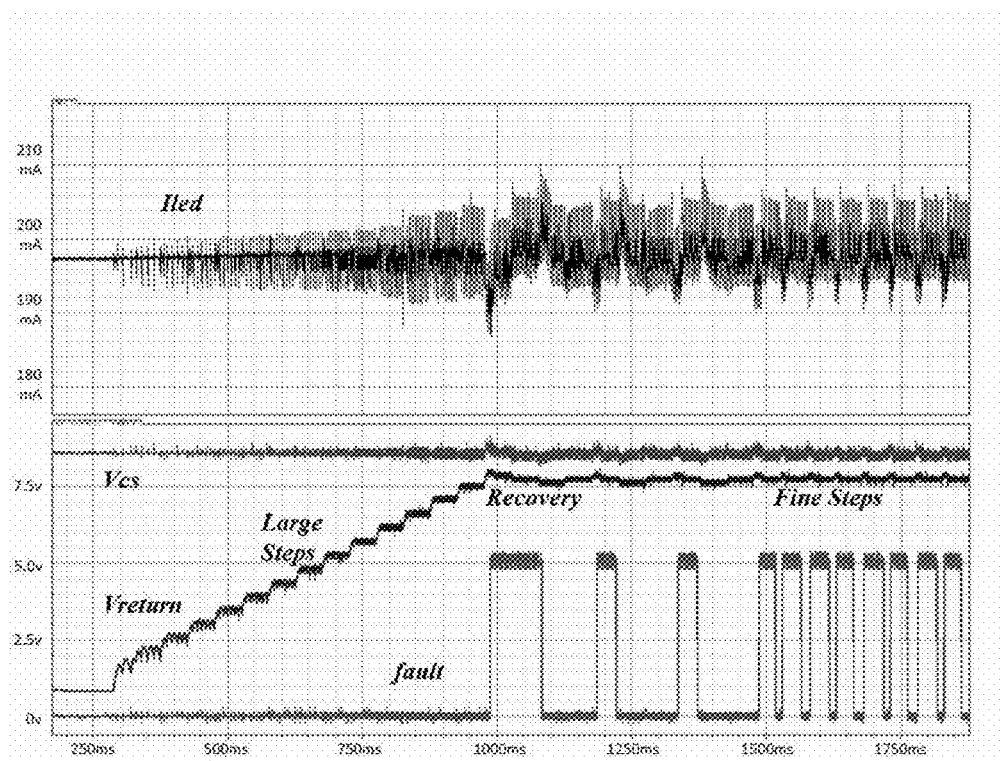
FIG. 4 shows current and selected voltages over time for the first embodiment.

FIG. 4 is a graph of some characteristics taken from a simulation of one example of the first embodiment. At the top of FIG. 4, the current that is being driven through the LED string is pictured. The absolute level of current in the simulation is about 197 mA, and the graph shows how a steady state current at the beginning of the simulation becomes a more variable one as the circuit turns on and begins to regulate the voltage drop across the current sink. This current variability is the tradeoff for decreased power dissipation across the current sink.

The bottom of FIG. 4 shows the various voltage measurements. The top voltage, Vcs, is the voltage at the top of the current sink, at the drain of the MOSFET M1. Vreturn is the voltage immediately below the current sink and the external resistor, and mimics Vtarget. The simulation run to generate this graph also shows "large steps" that were used to increase Vtarget quickly as the circuit starts up. After the first fault is detected, these large steps are disabled, and Vtarget moves only one increment per clock cycle, at what appears in the graph to be about 0.1 or 0.15 volts/cycle. The graph also clearly shows the relationship between the generated faults and the decreases in Vtarget, especially as the circuit reaches equilibrium at about 1500 ms.

Figure 5:
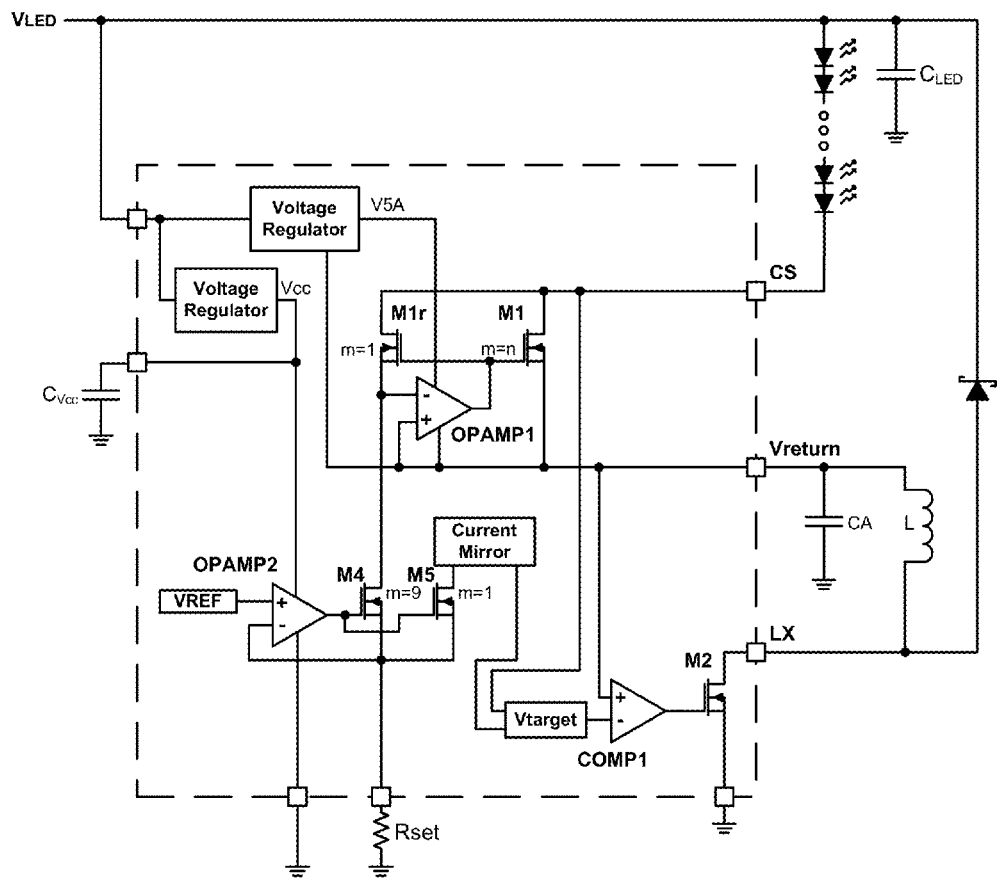
FIG. 5 shows a second embodiment of the invention controlling a string of LEDs.

FIG. 5 shows a second embodiment of the invention. In this second embodiment, the target voltage is established more directly, as a regulation point for the current sink return voltage. Vtarget in this embodiment is a function of the current sink terminal, the current in the current sink and the effective resistance of the current sink at its dropout voltage. In this case, the simple formula is Vtarget=Vcs−ILED*Rsink.

Figure 6:
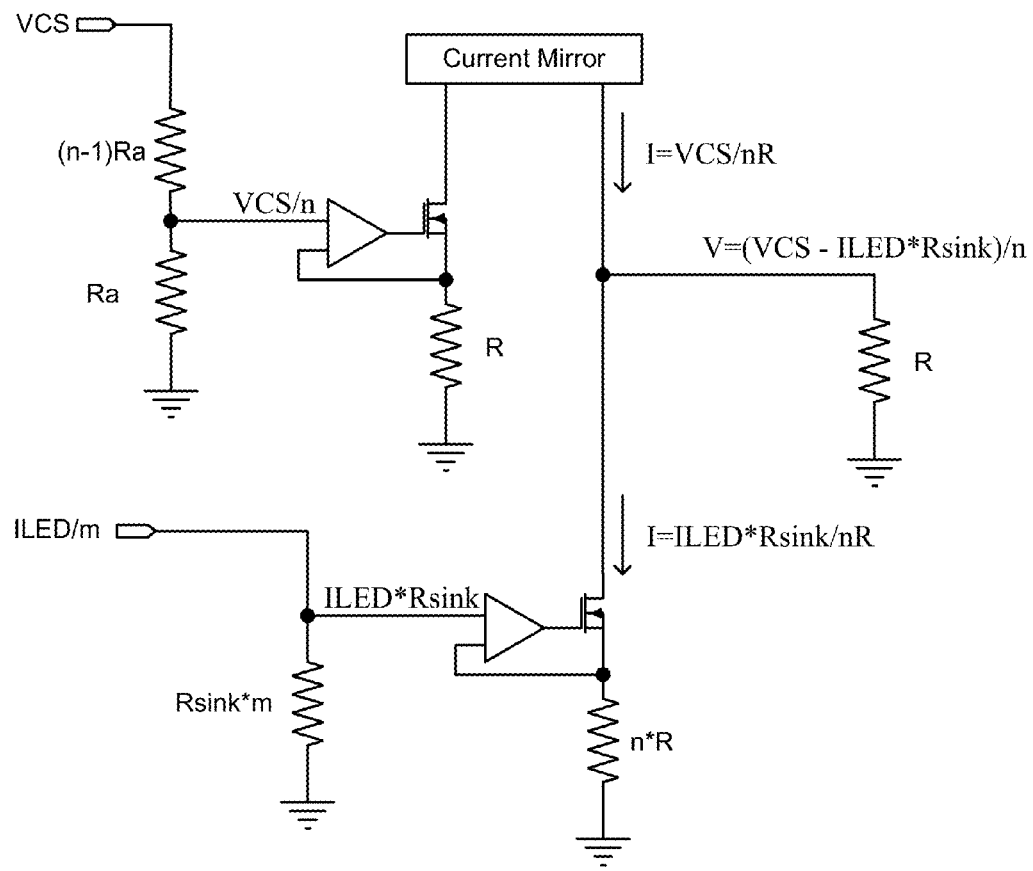
FIG. 6 shows the generation of the target voltage for the second embodiment.

One possible method of generating the target voltage is by summing currents. Summing currents provides a convenient way to scale the high voltage of CS and combine it with the available scaled version of ILED. As shown in FIG. 6, Vcs/n is converted to a current by a resistor divider of total value R. Vcs is divided by an appropriate scale factor, n, so that the highest voltage of CS is scaled down in accordance with the voltage rating of the devices used in the implemented process.

A scaled version of ILED is available by means of the current setting resistor Rset. If a scale factor, m, is used on ILED, the resistance of the current sink can be simply scaled up in a replica resistance, Rsink, by the same factor, m, to cancel the scale factor m. The generated voltage ILED*Rsink can in turn by scaled down by nR to be compatible with Vcs/nR.

The difference of the two currents is obtained by connecting the two current sources together as shown. The resultant current is converted back to a voltage by R, and the scaled voltage, (Vcs−ILED*Rsink)/n can be used as the target voltage for Vreturn, which would also be scaled by n for use in COMP1.

In addition, unique to the second embodiment is a floating current sink, a sub-circuit that is not referenced to ground. This unique current sink allows for best matching where, in a matching FET pair, the source pin is available for splitting rather than the drain pin. In this second embodiment, both MOSFETS in the pair (shown as M1 and M1r in FIG. 4) would have a breakdown voltage sufficiently high for the power source used in the enclosing television (or other appliance.) For example, a 140 volt power source would need to be coupled with two MOSFETS capable of withstanding 140 volts on their drain pins, a situation encountered when the LEDs are switched off and no current flows through the current sink.

In both embodiments, a comparator (shown as COMP1 in FIGS. 2 and 5) controls the ON and OFF switching of a MOSFET (shown as M2) in order to charge the inductor current when the return voltage is greater than the target voltage, and to discharge the inductor current when the return voltage is less than the target voltage.

When the inductor current is charging, the inductor current emanates from both the current through the current sink and the stored charge on the capacitor. As the current through the inductor increases and the voltage across the inductor decreases, Vreturn ramps down—and the voltage across the current sink ramps up.

Then, as M2 switches, the inductor discharges, releasing power back to the LED supply. Vreturn will ramp up as the current through the inductor decreases to a level that is below the current through the current sink, at which point the capacitor charges. When Vreturn is greater than Vtarget, M2 switches again, and the process repeats.

What is claimed is:

1. An integrated circuit to control a light emitting diode (LED) string that includes a plurality of serially connected LEDs, the LED string having a first end to be coupled to a power source and a second end, the integrated circuit comprising:

a first pin constructed to couple to the second end of the LED string;

a second pin constructed to couple to a first end of an external inductance;

a third pin constructed to couple to a second end of the external inductance;

a first MOSFET having a drain terminal coupled to the first pin; and a second MOSFET having a drain terminal connected to the third pin, the second MOSFET constructed to control a magnitude of current in the external inductance based on a target voltage at the second pin.

2. The integrated circuit of claim 1 further comprising a comparator having a first input coupled to the second pin, a second input constructed to receive the target voltage, and an output coupled to a gate terminal of the second MOSFET.

3. The integrated circuit of claim 2 further comprising an operational amplifier having a first input coupled to a voltage reference, a second input coupled to the source terminal of the first MOSFET, and an output coupled to a gate terminal of the first MOSFET.

4. The integrated circuit of claim 3 wherein the voltage reference includes one of a variable voltage reference and a fixed reference voltage reference.

5. The integrated circuit of claim 2 further comprising a target voltage circuit to generate the target voltage, the target voltage circuit having an input coupled to the gate terminal of the first MOSFET and an output coupled the second input of the comparator.

6. The integrated circuit of claim 5 wherein the target voltage circuit includes a regulation detect circuit to detect a dropout condition of the operational amplifier and to generate a fault signal responsive to detecting the dropout condition.

7. The integrated circuit of claim 6 wherein the target voltage circuit further includes a counter, coupled to the regulation detect circuit, to increase a count responsive to not receiving the fault signal and to decrease the count responsive to receiving the fault signal.

8. The integrated circuit of claim 7 further comprising a digital-to-analog converter, coupled to the counter, to generate the target voltage based on the count of the counter.

9. The integrated circuit of claim 7 wherein the regulation detect circuit includes a third MOSFET having a gate terminal coupled to the gate terminal of the first MOSFET.

10. The integrated circuit of claim 9 wherein the regulation detect circuit further includes an inverter having an input coupled to a drain terminal of the third MOSFET and an output coupled to the counter.

11. The integrated circuit of claim 1 further comprising a fourth pin, coupled to a source terminal of the first MOSFET, the fourth pin constructed to couple to the first end of the external inductance via an external resistance.

12. The integrated circuit of claim 1 wherein the first MOSFET has a source terminal coupled to the second pin.

13. The integrated circuit of claim 12 further comprising a comparator having a first input coupled to the second pin, a second input constructed to receive the target voltage, and an output coupled to a gate terminal of the second MOSFET.

14. The integrated circuit of claim 13 further comprising a target voltage circuit having an input coupled to the first pin, a second input constructed to receive a current having a magnitude that is proportional to a magnitude of current in the LED string, and an output coupled to the second input of the comparator, the target voltage circuit constructed to generate the target voltage based on the magnitude of the current and a voltage at the first pin.

15. The integrated circuit of claim 12 further comprising a first operational amplifier having a first input coupled to the source terminal of the first MOSFET, and an output coupled to a gate terminal of the first MOSFET.

16. The integrated circuit of claim 15 further comprising a third MOSFET having a gate terminal coupled to the output of the first operational amplifier, a drain terminal coupled to the drain terminal of the first MOSFET, and a source terminal coupled to a second input of the first operational amplifier.

17. The integrated circuit of claim 16 further comprising a fourth MOSFET having a drain terminal coupled to the source terminal of the third MOSFET.

18. The integrated circuit of claim 17 further a second operational amplifier having a first input constructed to receive a voltage reference, a second input coupled to a source terminal of the fourth MOSFET, and an output coupled to a gate terminal of the fourth MOSFET.

19. The integrated circuit of claim 17 further comprising a fifth MOSFET having a gate terminal coupled to a gate terminal of the fourth MOSFET, and a source terminal coupled to a source terminal of the fourth MOSFET.

20. The integrated circuit of claim 19 further comprising a current mirror coupled between the drain terminal of the fifth MOSFET and a target voltage circuit, the target voltage circuit generating the target voltage based on an output of the current mirror and a voltage at the first pin.

\* \* \* \* \*